United States Patent [19]
Pickard et al.

[11] 3,753,673
[45] Aug. 21, 1973

[54] PRESS BENDING OF GLASS SHEETS

[75] Inventors: John Pickard, Studley; Thomas Cartledge, Teesside, both of England

[73] Assignee: Triplex Safety Glass Company Limited, London, England

[22] Filed: July 2, 1969

[21] Appl. No.: 838,612

[30] Foreign Application Priority Data
  July 12, 1968  Great Britain ............ 33,394/68

[52] U.S. Cl. .............. 65/106, 65/162, 65/273, 65/275
[51] Int. Cl. ............................................ C03b 23/02
[58] Field of Search ............ 65/106, 162, 273, 65/274, 275, 287

[56] References Cited
UNITED STATES PATENTS
2,210,583  8/1940  Henry .................... 65/162
3,421,875  1/1969  Kirkman .................. 65/273

Primary Examiner—Arthur D. Kellogg
Attorney—Imirie, Smiley, Snyder and Butrum

[57] ABSTRACT

A glass sheet is bent to a required curvature between two relatively movable complementary bending dies which deform the glass sheet, which is heated to a temperature at which it is pliable. The respective overall heat losses from the two major surfaces of the glass sheet are adjusted during the bending operation so as to be substantially equal. For example, heat loss to one die may take place predominantly by conduction and the temperature of this die may be controlled, by means of heaters, to regulate the conductive heat loss associated with this die and effect the required heat loss balance.

7 Claims, 2 Drawing Figures

Patented Aug. 21, 1973
3,753,673
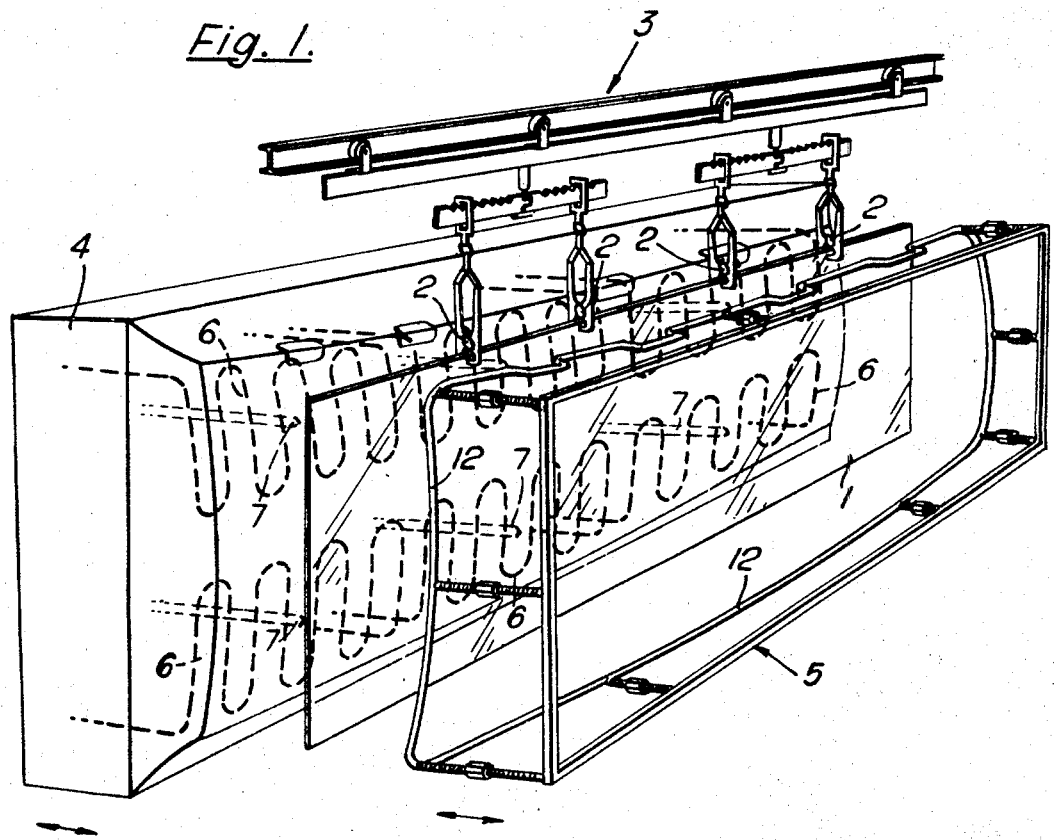
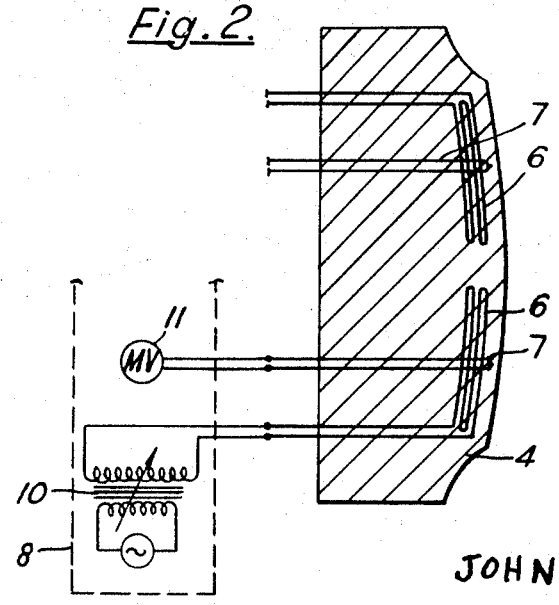
Inventors
JOHN PICKARD
THOMAS CARTLEDGE
By Imirie & Smiley
Attorneys

3,753,673

PRESS BENDING OF GLASS SHEETS

BACKGROUND OF THE INVENTION

1. Field of the Invention

This invention relates to the bending of glass sheets to a required curvature.

2. Description of the Prior Art

One known method of bending a glass sheet is to place the sheet, usually suspended vertically, between a pair of complementary bending dies, the sheet being heated to a temperature at or above the temperature at which the sheet can be formed to the desired shape. Relative movement, usually horizontally, of the two dies towards each other deforms the glass sheet to the curvature of the dies.

It is well-known that, when bending a glass sheet in this way, a further change in the shape of the curved glass sheet occurs after the bending dies have been retracted. This phenomenon, often referred to as "spring back" results from the differential cooling of the two major surfaces of the curved glass sheet which occurs when the sheet is deformed between the complementary bending dies, particularly if these dies are of dissimilar construction. When the dies are subsequently retracted, a temperature difference therefore exists between these two major surfaces, and as this temperature difference decays it causes distortion of the glass sheet.

An object of the present invention is to minimise the effect of "spring back" and thereby to permit bending of glass sheets with a consistent accuracy.

SUMMARY

The present invention accordingly provides a method of bending a glass sheet to a required curvature in which the sheet is heated to a temperature at which bending can be effected and is disposed between two relatively movable complementary bending dies which deform the heated glass sheet to a desired curvature, characterised in that the respective overall heat losses from the two major surfaces of the glass sheet during the bending operation are adjusted so as to be substantially equal.

The balance between the overall heat losses from the respective major surfaces of the glass sheet may be effected by controlling the heat loss from one of the major surfaces during the bending operation. This is conveniently effected by arranging that the heat loss from said one major surface occurs predominantly by conduction to the respective bending die, and by regulating the conductive heat loss associated with said die by controlling the temperature of said die. Thus said die may be heated in a controlled manner so as to maintain its bending surface at a predetermined temperature lower than the temperature of the glass sheet as it is bent.

The bending temperature of industrial soda-limesilicate glass sheets lies between 550° and 700°C, and can, for example, be about 670°C. For bending such glass sheets by the method of the present invention the said bending die to which heat loss occurs predominantly by conduction is preferably maintained at a surface temperature of 200° to 400°C, a temperature of about 300°C being preferred.

The present invention also provides apparatus for use in bending a glass sheet to a required curvature, comprising two relatively movable bending dies having complementary bending surfaces, means for supporting a glass sheet between the dies, the glass sheet being heated to a temperature at which bending can be effected, and means for moving the dies relatively towards each other to effect bending of the glass sheet, characterised in that one only of the dies is so constructed that heat loss from the glass sheet to the one said die takes place primarily by conduction and temperature-regulating means are incorporated in said one die for regulating the temperature thereof in order to control the overall heat loss to said one die during the bending operation, so as substantially to balance the overall heat loss to said one die with the overall heat loss to the other said die.

The said one die, which in a preferred embodiment of the invention has a convex bending surface, may be of solid construction, having contained therein at least one electrical heating element and at least one temperature-sensing element disposed near the bending surface of the die for monitoring the temperature of said surface.

Preferably, a plurality of electrical heating elements and associated temperature-sensing elements are provided in said one die, said elements being arranged in respective zones, each provided with a respective regulating device for regulating the electric current supplied to the respective heating element or elements in said zone. The respective current-regulating devices may comprise respective variable transformers.

The heat-conductive die may alternatively comprise a curved metal plate having radiant heaters — for example gas or electric heaters — arranged behind the plate.

The bending surface of the said one die may be covered with a layer of a material which is non-sticking or non-wettable with respect to glass. One such material is boron nitride, but glass fibre cloth is preferred in practice.

The invention also comprehends a glass sheet which has been bent by the method herein defined.

BRIEF DESCRIPTION OF THE DRAWINGS

FIG. 1 is a diagrammatic perspective view, by way of example, of apparatus for use in bending glass sheets according to the invention, and FIG. 2 is a cross section, taken in a vertical plane, through the convex or male bending die of said apparatus, and showing diagrammatically the electrical connections to one of the heated zones thereof.

DESCRIPTION OF THE PREFERRED EMBODIMENT

Referring to FIG. 1, a flat glass sheet 1 to be bent is suspended in a vertical plane by tongs 2 which grip the upper edge of the sheet 1. The tongs 2 are supported by a horizontal overhead conveyor 3, part only of which is shown.

The glass sheet 1, suspended by the tongs 2, is first passed by the conveyor 3 through a furnace (not shown) in which the sheet is heated to a temperature, of the order of 670°C for industrial soda-lime-silicate glass, at which the sheet is sufficiently pliable to permit bending to a desired shape.

The heated glass sheet 1 is passed from the furnace to a bending station at which the sheet is disposed between two bending dies 4, 5 which are mounted on suitable supports (not shown in the interests of clarity) for movement horizontally towards and away from each other as required. The dies 4, 5 are complementary, the die 4 in this case being a convex or male die and the die 5 being a concave or female die.

The convex die 4 in the illustrated embodiment is of solid construction, and is formed from a cast refractory material. A suitable refractory material comprises four parts of fused silica crushed to pass through a 10-mesh sieve, mixed with one part of Ciment Fondu which is a hydraulic high alumina cement and water: such a mixture can be moulded easily to give a convex bending surface of the required curvature. For some bending operations, for example, for forming curved glass windscreens or rear lights of motor vehicles, the bending surface may have double curvature, for example double convex curvature as in the illustrated embodiment.

Upon casting of the refractory convex die 4 a plurality of electrical heating elements 6 are embedded in the die, the elements 6 being shown diagrammatically in broken lines in FIG. 1. The refractory material of the die 4 is packed tightly around the elements 6 upon moulding to give good thermal contact.

The heating elements 6 can conveniently be formed by winding 18 S.W.G. This wire is nickel-chrome alloy with the addition of small percentages of other metals to achieve a long lasting heating element. "Brightray" (Registered Trade Mark) C wire upon a ¼" diameter mandrel. A typical heating element consists of a 62 ft. length of wire having a resistance of 17.7 ohms and taking 13 amps from a 230 volt supply. Such a heating element gives a heat output of about 26 watts per square inch.

To facilitate precise control of the surface temperature of the convex bending die 4, the die is divided into a number of separate control zones, six such zones being shown in this example. The number of heating elements 6 associated with each zone is selected in accordance with the size of the zone, the heating elements of any one zone being connected in parallel and connected by internal leads (not shown) to a respective pair of porcelain-insulated terminals.

Respective temperature-sensing elements, in this case thermocouples, are also embedded in the convex die 4, as indicated in broken lines at 7 in the drawings, one thermocouple 7 being provided for each control zone, with the temperature-responsive junction close to the convex bending surface of the die 4 and centrally in the respective zone. The leads from each thermocouple 7 are connected to further respective pairs of porcelain-insulated terminals.

The terminals associated with the heating elements 6 and thermocouple 7 of each respective control zone are connected by respective asbestos-insulated cables to respective terminals of a junction box disposed at the periphery of the die 4, and shielded from exposure to heat from said die. A remote control unit having separate control sections for each respective control zone of the die 4, is connected to this junction box. The control unit, part of which is indicated diagrammatically by the broken lines 8 in FIG. 2, includes, for each respective control zone, a respective variable transformer 10 for controlling the power supplied from an alternating current supply to the respective heating elements 6 of said zone and a respective micro-voltmeter 11 for measuring the electro-motive force generated in the respective thermocouple 7 of said zone. Preferably the micro-voltmeters 11 are calibrated to give direct readings of the temperature in the respective zones. The variable transformers 10 can be adjusted manually in order to maintain a predetermined uniform temperature, for example, 300°C in each zone, or, alternatively, an automatic control system may be provided for maintaining said predetermined temperature automatically.

The concave or female die 5 comprises a metal open frame structure having shaped peripheral frame members 12 which are adapted to engage the marginal regions of the glass sheet 1 when effecting bending. To minimise marring of the surface of the glass sheet the frame members 12 may be covered with woven glass cloth or some other material to which glass does not stick.

The bending of each glass sheet 1 to the desired shape takes place by contact of the sheet with the bending surfaces of the complementary dies 4, 5 when the latter are advanced towards each other. Typically, the dies 4, 5 are held in their closed position for about two seconds.

During this time when the dies 4, 5 are in their closed position, heat loss occurs from the two major surfaces of the glass sheet 1. The convex surface of the sheet 1, in contact with the skeletal female die 5, loses heat by radiation and convection, and the concave surface, in contact with the solid convex or male die 4, loses heat mainly by conduction.

It has been found that the phenomenon of "springback," that is, the distortion of the curved glass sheet after completion of the bending operation, is due almost entirely to the differential heat losses which occur from the two major surfaces of the glass sheet. In appreciation of this, the present invention is seen to provide means whereby the heat loss from one of the major surfaces, specifically the heat loss by conduction from the concave surface in contact with the convex die 4, can be regulated. Thus the heating elements 6 in the convex die 4 are controlled so as to limit the conductive heat transfer from the sheet 1 to the die 4, so maintaining the temperature of the working surface of the die 4, that the overall heat loss from the glass surface in contact with the die 4 substantially balances the overall heat loss from the other surface engaged by the die 5.

In the example described, if the convex die 4 is maintained at a temperature between 200° and 400°C, and preferably about 300°C, the desired thermal balance between the two dies 4, 5 can be achieved, for a die closure time of about 2 seconds. After the curved sheet 1 has been removed from between the dies 4, 5 and allowed to cool, the "spring-back" of the curved sheet is much reduced, and hence the curvature of the sheet ultimately obtained has a much closer conformity to the configuration of the surface of the convex bending die 4 than it would otherwise have.

As an alternative to using cast refractory material for the convex die 4 a cast metal convex die or a metal die formed conventionally from metal plate or sheet may be used. A satisfactory metal for the die 4 is an aluminum or a copper based alloy in cast form for example, an alloy containing 1 percent chromium and 99 percent copper. Such a metal die has the advantage of high strength combined with high conductivity, the latter assisting in accurately maintaining a controlled temperature at the surface of the die 4. Control of the temperature of the die surface may be effected by means of radiant gas or electric heaters located behind the die.

Specifically, where a cast metal die is used, the surface temperature may be regulated by means of electrically insulated high temperature heaters of the "PYROTENAX" (Registered Trade Mark) type inserted in suitable holes in the rear of the die. These heaters are formed by encasing a nickel-chrome heating element in a high temperature mineral insulation such as magnesium oxide within a metal sheath formed of nichrome.

If a cast metal is used to form the convex die 4, the die surface is preferably machined and subsequently hand polished to give a fine, smooth finish.

Where a solid cast metal convex or male die 4 is employed, it is no longer necessary to embed heating elements within the body of the die, as in the embodiment specifically illustrated: in view of the high conductivity of a solid metal die it is satisfactory to provide die heaters in the form of heating elements clamped to the rear surface of the die. Suitable strip heating elements are those of the "Chromalox" (Trade Mark) type, consisting of a nickle-chrome heating conductor contained within a ceramic filled nickel alloy sheath.

The bending surface of the convex or male die 4 in the embodiments herein described in preferably covered with a layer of a material which is non-sticking or non-wettable with respect to glass, in order to minimise marring of the glass surface upon contact with the die. As stated previously, a suitable such material is woven glass fibre cloth. Boron nitride may alternatively be used, being applied to the metal die surface by spraying, brushing or dipping.

We claim:

1. Method of bending a glass sheet to a required curvature, comprising heating the glass sheet to a temperature within the bending temperature range of the glass, locating the heated glass sheet between a first bending die of open form for contacting a minor portion only of one surface of the sheet and an opposed complementary second bending die for contacting a major portion of the other surface of the sheet, moving the dies relatively towards each other to bend the heated glass sheet to the required curvature, and heating the second bending die to adjust the rate of heat loss from said other surface of the sheet substantially to the rate of heat loss from said one surface of the glass sheet during the bending operation to effect a balance between the respective overall heat losses from the two surfaces of the glass sheet.

2. Method according to claim 1, in which the heating of the second bending die is continuously controlled throughout the bending operation to effect the balance between the respective overall heat losses from the two surfaces of the glass sheet.

3. Method according to claim 2, in which the heat loss from said one surface occurs predominantly by conduction to the second bending die, and in which the heating of said second bending die is controlled to regulate the conductive heat loss associated with said second bending die.

4. Method according to claim 3, in which said second bending die is heated in a controlled manner to maintain its bending surface at a predetermined temperature lower than the temperature of the glass sheet as it is bent.

5. Method according to claim 4, in which said predetermined temperature lies in the range 200° to 400°C for a die closure time of about 2 seconds.

6. Method according to claim 5, in which said predetermined temperature is of the order of 300°C.

7. The method of forming a glass sheet to provide respectively concave and convex opposite surfaces thereon having selected curvatures, which comprises the steps of:

a. heating the sheet while flat to a selected temperature within the bending temperature range of the glass;

b. contacting a minor portion only of one surface of the sheet while at said selected temperature with a concave bending die whereby heat transfer from said one surface occurs at a particular rate due in part only to contact with said concave bending die;

c. simultaneously with (b), contacting at least a major portion of the other surface of said sheet with a convex bending die whereby heat transfer from said other surface occurs at least predominantly through heat loss to said convex bending die;

d. controlling the temperature of said convex bending die to adjust the rate of heat transfer from said other surface of said sheet substantially to said particular rate at which heat is transferred from said one surface of said sheet whereby to obtain substantial equality of temperatures for the convex and concave surfaces of said sheet formed respectively by steps (b) and (c); and e. removing said bending dies from contact with said sheet while the substantial equality of temperatures specified in step (d) prevails whereby said convex and concave surfaces of the sheet retain said selected curvatures thereof as imparted by said bending dies.

* * * * *